United States Patent [19]
Thompson

[11] Patent Number: 5,487,565
[45] Date of Patent: Jan. 30, 1996

[54] VEHICLE WATER SPRAY DIVERTER

[76] Inventor: Bradley J. Thompson, 9416 S. 69th East Ave., Skiatook, Okla. 74133

[21] Appl. No.: 375,955

[22] Filed: Jan. 20, 1995

[51] Int. Cl.⁶ .............................. B62B 9/16; B62D 25/16
[52] U.S. Cl. ............................................. 280/848; 280/851
[58] Field of Search ..................... 280/848, 849, 280/850, 851, 154, 847, 854

[56] References Cited

U.S. PATENT DOCUMENTS

| | | | |
|---|---|---|---|
| 2,196,225 | 4/1940 | Morrison | 280/848 X |
| 3,675,943 | 7/1972 | Moore . | |
| 3,721,459 | 3/1973 | Lea . | |
| 3,860,262 | 1/1975 | Goings . | |
| 4,124,221 | 11/1978 | Goings . | |
| 4,138,129 | 2/1979 | Morris | 280/848 X |
| 4,174,850 | 11/1979 | Hart | 280/848 |
| 4,215,873 | 8/1980 | Price | 280/848 |
| 4,372,570 | 2/1983 | Goodall | 280/851 |
| 4,427,208 | 1/1984 | Jürges . | |
| 4,436,319 | 3/1984 | Clutter . | |
| 4,445,700 | 5/1984 | Schroeder . | |
| 4,585,242 | 4/1986 | Sparks . | |
| 4,706,981 | 11/1987 | Dorwart . | |
| 4,817,976 | 4/1989 | Kingsley . | |
| 4,921,276 | 5/1990 | Morin | 280/848 |
| 5,267,752 | 12/1993 | Miller | 280/848 |
| 5,269,547 | 12/1993 | Antekeier . | |
| 5,277,444 | 1/1994 | Stropkay . | |
| 5,299,831 | 4/1994 | Schmidt . | |

FOREIGN PATENT DOCUMENTS

| | | | |
|---|---|---|---|
| 2827845 | 1/1980 | Germany | 280/851 |
| 1516413 | 10/1989 | U.S.S.R. | 280/850 |

*Primary Examiner*—Brian L. Johnson
*Attorney, Agent, or Firm*—Head & Johnson

[57] ABSTRACT

A device to block and divert lateral water spray generated from a vehicle, the vehicle including a plurality of tires and a body having a pair of lateral sides on opposite sides of a center, an underside between said lateral sides, and a rear. The device includes a first gutter portion attached to one said lateral side to trap and direct said water spray toward said rear. A second gutter portion is in fluid communication with the first gutter portion in order to divert the water spray from the lateral side toward the center and away from the underside down toward the ground.

10 Claims, 3 Drawing Sheets

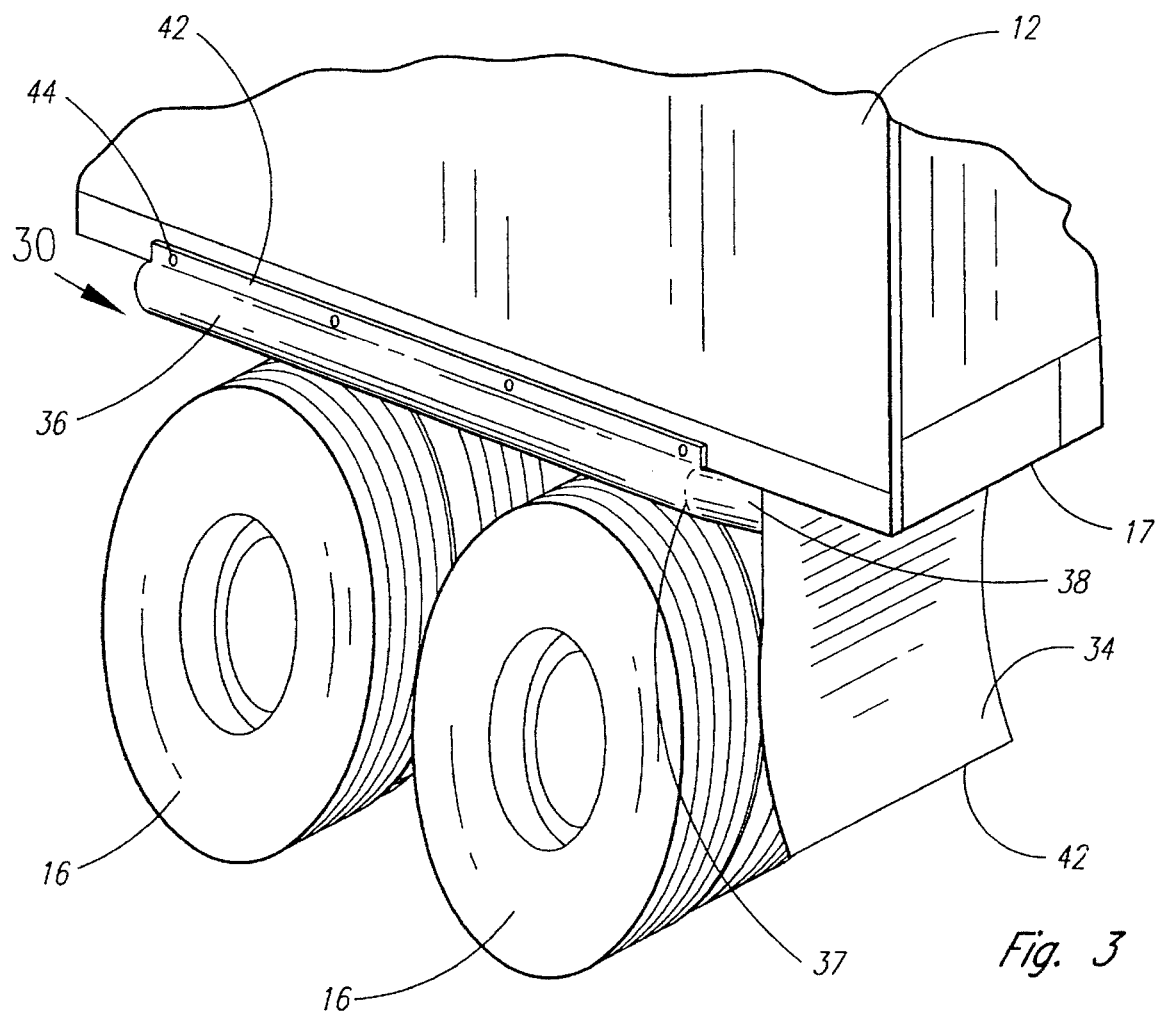
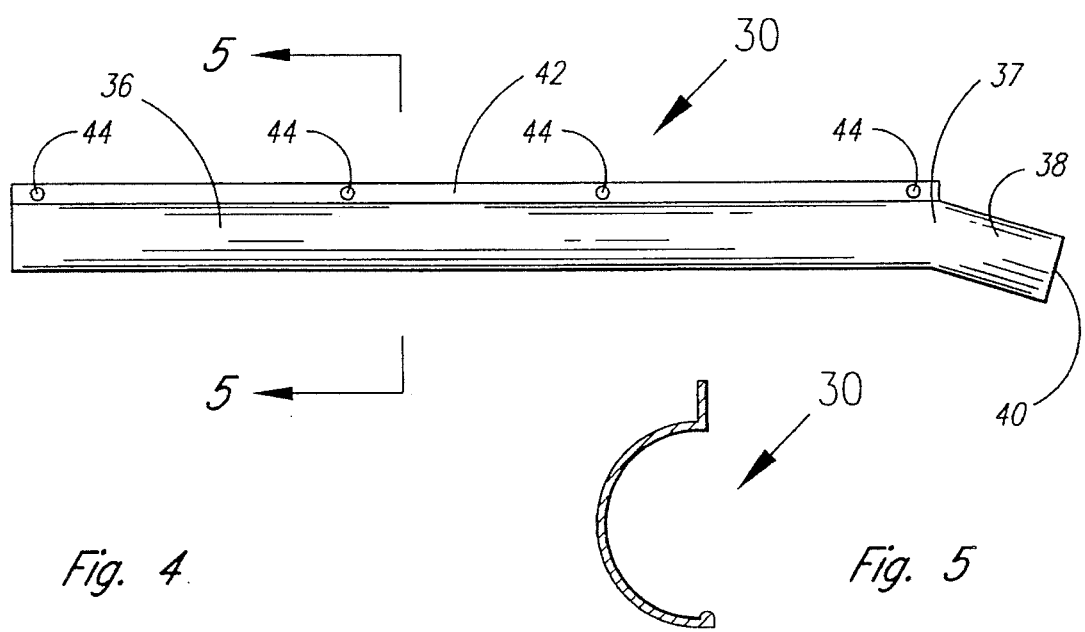
Fig. 3
Fig. 4
Fig. 5

5,487,565

VEHICLE WATER SPRAY DIVERTER

BACKGROUND OF THE INVENTION

1. Field of the Invention

The present invention is directed to a device to block and divert lateral water spray generated from vehicle tires moving over a wet surface wherein water drops strike against the underside of the vehicle and are sprayed laterally outward.

2. Prior Art

When vehicle tires move across a wet surface, droplets of water will adhere to the tires and are thrown upward from the road. While these water droplets move in various directions, it has been found that a great amount of water is thrown upward against the underside of a vehicle. In the case of large trucks and tractor trailers with multiple large wheels, a large amount of water spray is thrown against the underside of the truck which then produces a spray of water in all directions. Particularly in cases of vehicles moving at fast highway speeds, water is thrown laterally outward from the underside of the vehicle and past the lateral sides of the vehicle. This laterally moving water spray is a problem to vehicles behind, to the side of, and approaching the truck or tractor trailer. Additionally, in winter conditions, salt water spray thrown laterally is damaging to vegetation.

While mudflaps are utilized (and are often required) to block the rearwardly moving water spray, the laterally moving water spray remains a problem.

This laterally moving water spray has been identified as a problem. As an example, Moore et al. (U.S. Pat. No. 3,675,943) discloses a bracket secured to the side of a truck bed and the hub of a wheel in order to create side mudflaps.

Alternate solutions have also been proposed. For example, Stropkay (U.S. Pat. No. 5,277,444) controls the lateral discharge of water spray from truck tires with a hollow body device having channels that direct air flow in order to create an air screen that discourages laterally moving water. Schmidt (U.S. Pat. No. 5,299,831) provides an exhaust suction device.

There remains a need for a simple device that may be attached to the body of a vehicle in order to block the lateral water spray generated from vehicle tires moving over a wet surface and divert it toward the center of the vehicle and downwardly away from the underside of the vehicle toward the ground.

There is also a need for a device to block and divert lateral water spray that may be simply and quickly attached to and detached from existing vehicles.

There is also a need for a device to block and divert lateral water spray which may be used and operated in conjunction with existing mudflaps.

There is also a need for a device to block and divert lateral water spray and discharge the water closer to the ground and toward the center of the vehicle.

SUMMARY OF THE INVENTION

The present invention provides a device to block and divert lateral water spray generated from a vehicle moving over a wet roadway. As the tires of the vehicle rotate, drops of water are adhered to the tires and are thrown upward against the underside of the vehicle. The water droplets are dispersed in all directions, causing a spray, cloud, or mist.

The water spray diverter device includes an elongated first gutter portion which is attached to one lateral side of the vehicle and extends beneath the level of the underside. The first gutter portion is lateral of the vertical plane of the outermost tire.

The first gutter portion may be permanently affixed to the tractor-trailer, or may be removably attached thereto.

The lateral water spray which strikes the underside of the vehicle and moves laterally will be trapped in the first gutter portion. The first gutter portion forms a continuous channel so that water droplets in the channel may move therein. The water droplets will tend to move in the first portion toward the rear of the vehicle.

The first gutter portion is connected at its rearmost end to a second gutter portion which is in fluid communication with the first gutter portion. The second gutter portion likewise forms a channel for direction and movement of water therein. The second gutter portion is angled away from the underside of the vehicle downward toward the roadway. The second gutter portion is also in angular relation to the first gutter portion so that the second gutter portion is angled toward the center of the vehicle.

The second gutter portion terminates in an open end where the water may be discharged. The second gutter portion terminates in front of the existing mudflap so that the second gutter portion discharges the water collected in front of the existing mudflap. Accordingly, the discharge of water is directed downward toward the ground so that it will exit beneath the lower edge of the mudflap. Additionally, the discharge of water is directed toward the center of the vehicle away from the lateral sides.

BRIEF DESCRIPTION OF THE DRAWINGS

FIG. 3 illustrates a partial view of the tractor-trailer shown in FIG. 2 with the device to block and divert lateral water spray attached thereto;

FIG. 4 illustrates the device to block and divert lateral water spray apart from the tractor-trailer; and FIG. 5 is a cross-sectional view of the water spray diverter device taken along section line 5—5 of FIG. 4

DETAILED DESCRIPTION OF THE PREFERRED EMBODIMENTS

Figure 1:
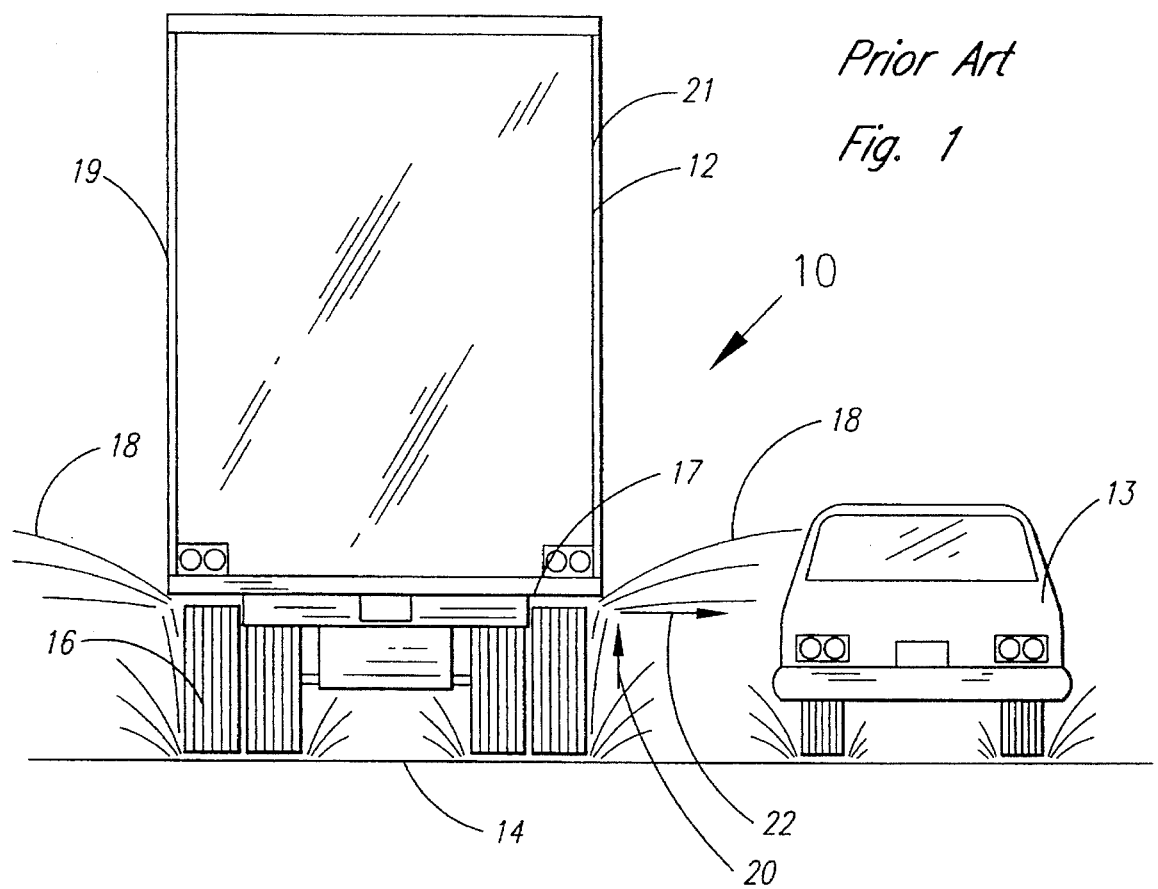
FIG. 1 illustrates a tractor-trailer and car moving across a wet roadway prior to introduction of the present invention.

Referring to the drawings in detail, FIG. 1 illustrates a view of the prior art without use of the present invention. Two vehicles, a tractor-trailer 12 and car 13 are shown moving across a wet roadway 14. In FIG. 1, the usual flexible mudflaps which extend from the underside of the vehicle toward the roadway 14 have been removed for clarity. The truck includes an underside 17 above the tires 16, a longitudinal center with lateral opposed sides 19 and 21. When large vehicles such as a tractor-trailer 12 move across a wet surface such as roadway 14, a great amount of water will adhere to the tires 16 as they rotate and be lifted and thrown upward from the road surface with force against the underside 17 of the truck 12. Upon striking the underside 17, this action causes a large amount of water spray to be thrown in all directions. As seen in FIG. 1, water causing a spray, cloud, or mist is thrown laterally outward from the underside of the vehicle past the lateral sides of the vehicle as indicated at reference numeral 18. While this spray, cloud, or mist is disbursed in all directions, a great portion of it is disbursed laterally.

It will be observed that the lateral water spray 18 poses a significant visibility problem for vehicles on either side of the tractor-trailer 12, including oncoming vehicles.

The direction of the water from the roadway 14 is initially upward as indicated by arrow 20 from the road surface toward the underside 17 of the tractor-trailer 12. Thereafter, the water droplets are thrown in all directions, including laterally outward as indicated by arrow 22.

Figure 2:
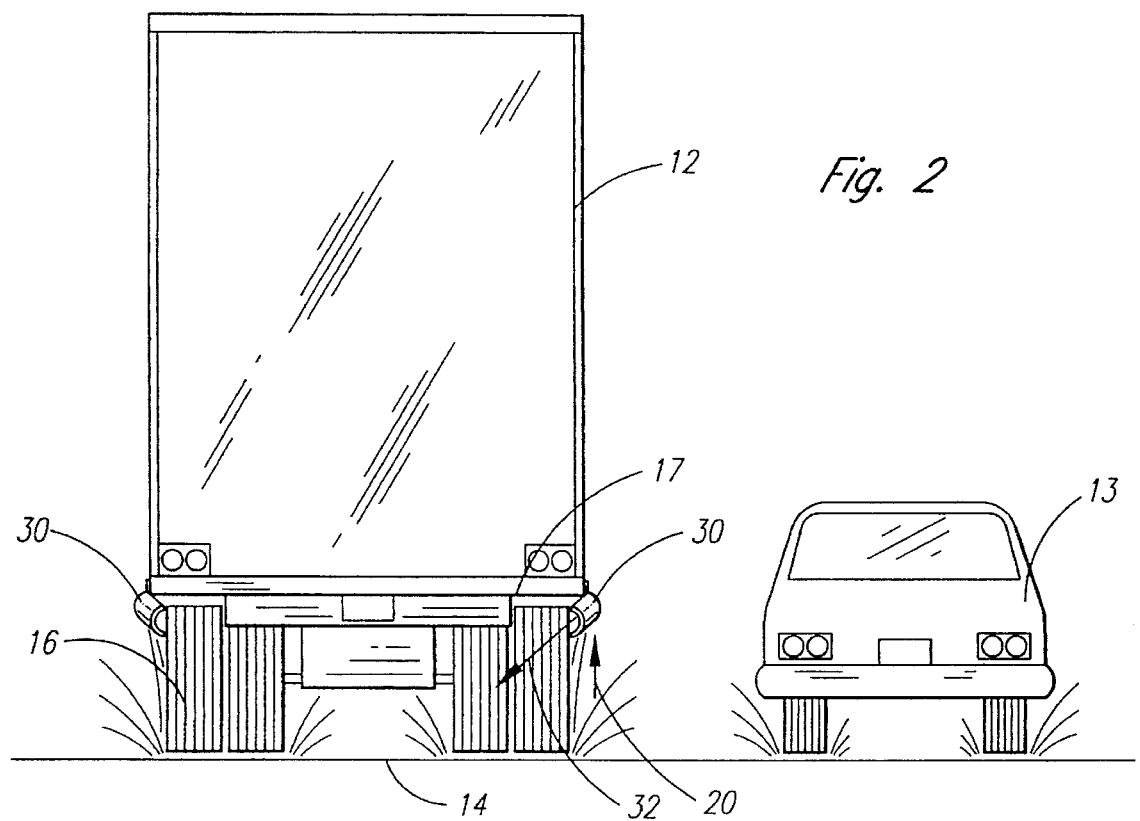
FIG. 2 illustrates the tractor-trailer and car moving across a wet roadway as shown in FIG. 1 making use of the water spray diverter device of the present invention.

FIG. 2 illustrates the tractor-trailer 12 and car 13 moving across a wet roadway 14 with the device to block and divert water spray 30 of the present invention installed. Again, the mudflaps which extend from the underside of the vehicle have been removed from the drawing for clarity. As the tires 16 rotate at great speed, drops of water are adhered to the tires and are thrown upward as shown by arrow 20. The water droplets strike with force against the underside 17 of the tractor-trailer 12. The water droplets may even be caused to be broken into smaller particles causing a spray, cloud, or mist.

Through the use of the present invention, however, the bulk of water droplets and water spray do not move laterally outward as in the description of FIG. 1. Rather, the laterally moving water droplets and spray are trapped in the diverter device 30 and directed downward toward the roadway or ground and also directed in the direction toward the center of the tractor-trailer 12. By directing the water toward the longitudinal center of the vehicle, the amount of water escaping laterally is minimized. This is indicated in FIG. 2 by arrow 32.

FIG. 3 illustrates a partial view of the tractor-trailer 12 with the rear tires 16 clearly visible. The underside 17 is above the level of the tires. The mudflap 34 is shown installed in place behind the rear wheels extending from the underside 17 of the vehicle.

The water spray diverter device 30 of the present invention includes an elongated first gutter portion 36 which is attached to one lateral side 19 of the tractor-trailer 12 and extends beneath the level of the underside 17. Alternatively, the first gutter portion 36 may be attached to the underside 17. The first gutter portion is lateral of the vertical plane of the outermost tire 16.

The first gutter portion 36 may be permanently affixed to the tractor trailer 12 or may be removably attached thereto. The first portion 36 may be removably connected to the tractor-trailer 12 through a clamp or clamps (not shown).

The diverter device 30 is somewhat flexible so that in the event a stone or other material strikes the device, or ice builds up, no damage will be done.

It has been found that a great proportion of the water spray moves laterally within a few inches of the underside. The lateral water spray previously described which strikes the underside 17 of the tractor-trailer 12 and moves laterally will be trapped in the first gutter portion 36. The first gutter portion 36 is slightly offset from the outermost tire so as to trap a substantial portion of the water spray therefrom.

The first gutter portion 36 forms a continuous channel so that water droplets in the channel may move therein. The diverter device 30 is used while the vehicle is moving so that the water droplets will tend to move in the first gutter portion 36 toward the rear of the vehicle. Stated another way, the first gutter portion 36 will be moving with the vehicle so that the water droplets will be directed rearward.

Additionally, the force of air due to the vehicle moving assists in forcing the water in the first gutter portion 36 rearward. The first gutter portion 36 is connected at its rearmost end 37 to an elongated second gutter portion 38 which is in fluid communication with the first portion. The second gutter portion 38 likewise forms a channel for direction and movement of water therein. The second gutter portion 38 is in angular relation to the first gutter portion at between 30 to 45 degrees. The water is thus moved from the lateral side of the vehicle where it is gathered and moved toward the longitudinal center of the vehicle.

Additionally, the second gutter portion is angled away from the underside of the vehicle 12 downward toward the roadway 14. The water gathered is, thus, displaced in two directions.

The second gutter portion 38 terminates in an open end 40 where the water is discharged.

FIG. 4 illustrates the diverter device 30 apart from the tractor trailer 12. The diverter device 30 includes a lip 42 with openings 44 for use in attaching the diverter device 30 to the vehicle. The first and second gutter portions each have arcuate cross sections and as seen in FIG. 5 the cross sections are hemispherical.

With continuing reference to FIG. 3, it will be observed that the open end 40 of the second gutter portion 38 discharges water in front of the existing mudflap 34. Accordingly, the discharge of water is directed downward toward the ground so that it will exit beneath the lower edge 42 of the mudflap.

It will be observed that both the first and second gutter portions are open channels to discourage blockage or ice build-up.

The opposite lateral side 21 would have a similar diverter device to collect and disperse water spray.

Figure 6:
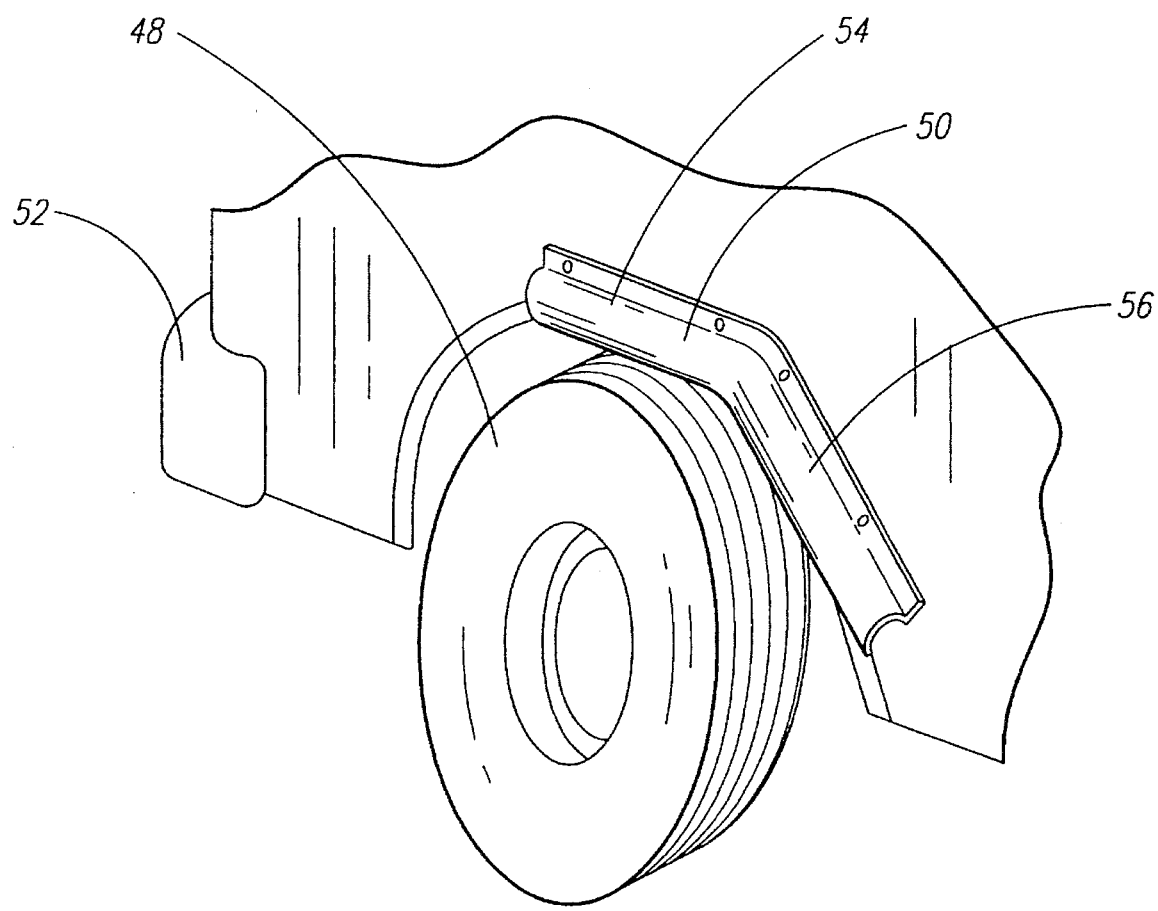
FIG. 6 is an alternate embodiment of the water spray diverter device of the present invention.

FIG. 6 is a view of an alternate embodiment of the diverter device 50 installed for the front tires 48 of a vehicle. A portion of the left front side of the vehicle 12, including the front bumper 52, is visible in FIG. 6. A first portion 54 is attached to the front wheel-well above the tire level. A second portion 56 is in fluid communication with the first portion and is in angular relation thereto. The water spray which would normally emanate from the front wheel-well is trapped and diverted.

Whereas, the present invention has been described in relation to the drawings attached hereto, it should be understood that other and further modifications, apart from those shown or suggested herein, may be made within the spirit and scope of this invention.

What is claimed is:

1. A device to block and divert lateral water spray generated from a vehicle, said vehicle including a plurality of tires and a body having a pair of lateral sides on opposite sides of a center, an underside between said lateral sides, and a rear, which device comprises:

an elongated, longitudinally extending first gutter portion attached to said vehicle to trap and direct said water spray toward said rear; and a second gutter portion extending inwardly and downwardly and in fluid communication with said first gutter portion to divert said water spray from said first gutter portion away from said lateral sides toward said center and away from said underside down toward the ground.

2. A device to block and divert lateral water spray as set forth in claim 1 including means to removably connect said first gutter portion to said vehicle lateral side.

3. A device to block and divert lateral water spray as set forth in claim 1 wherein said second gutter portion is in angular relation to said first portion at between 30 to 45 degrees.

4. A device to block and diver lateral water spray as set forth in claim 1 wherein said first and second portions have arcuate cross sections.

5. A device to block and divert lateral water spray as set forth in claim 4 wherein said cross section is hemispherical.

6. A device to block and divert lateral water spray as set forth in claim 1 wherein said first and second gutter portions are flexible.

7. A device to block and divert lateral water spray as set forth in claim 1 wherein said second gutter portion terminates in front of a mud flap extending away from said vehicle underside toward said ground.

8. A process to block and divert lateral water spray generated from a vehicle, said vehicle including a plurality of tires and a body having a pair of lateral sides on opposite sides of a center, an underside between said lateral sides, and a rear, which process comprises:

trapping said laterally moving water spray in an elongated, longitudinally extending first gutter portion attached to one said lateral side;

directing said water spray in said first gutter portion rearwardly through said first gutter portion;

directing said water spray into a second gutter portion has been added to clearly define over the prior art in fluid communication with said first gutter portion toward said center and toward said ground away from said underside; and releasing said water spray from said second gutter portion away from said lateral sides and away from said underside.

9. A process to block and divert lateral water spray as set forth in claim 8 including the additional step of removably connecting said first gutter portion to said lateral side.

10. A process to block and divert lateral water spray as set forth in claim 8 including the additional step of releasing said water spray from said second gutter portion in front of a mudflap extending from said vehicle underside.

* * * * *